(12) United States Patent
Shan

(10) Patent No.: US 7,865,389 B2
(45) Date of Patent: Jan. 4, 2011

(54) ANALYZING TIME SERIES DATA THAT EXHIBITS SEASONAL EFFECTS

(75) Inventor: Jerry Z. Shan, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 616 days.

(21) Appl. No.: 11/879,980

(22) Filed: Jul. 19, 2007

(65) Prior Publication Data
US 2009/0024427 A1 Jan. 22, 2009

(51) Int. Cl.
*G06F 17/00* (2006.01)
(52) U.S. Cl. .................................................. 705/10
(58) Field of Classification Search ................ 705/10
See application file for complete search history.

(56) References Cited

U.S. PATENT DOCUMENTS

| | | | |
|---|---|---|---|
| 5,676,690 A | 10/1997 | Noren | |
| 5,712,985 A | 1/1998 | Lee et al. | |
| 5,852,793 A | 12/1998 | Board et al. | |
| 5,893,069 A | 4/1999 | White | |
| 6,532,449 B1 | 3/2003 | Goertzel | |
| 6,760,847 B1 | 7/2004 | Liu et al. | |
| 7,111,007 B2 | 9/2006 | Thier | |
| 7,200,505 B2 | 4/2007 | Shan | |
| 7,369,961 B2 * | 5/2008 | Castelli et al. | 702/176 |
| 2002/0169658 A1 | 11/2002 | Adler | |
| 2003/0018501 A1 | 1/2003 | Shan | |
| 2005/0256759 A1 * | 11/2005 | Acharya et al. | 705/10 |
| 2006/0041201 A1 | 2/2006 | Behbehani et al. | |
| 2008/0221974 A1 | 9/2008 | Gilgur | |
| 2009/0024407 A1 | 1/2009 | Shan | |
| 2009/0024444 A1 | 1/2009 | Shan | |
| 2009/0327185 A1 * | 12/2009 | Castelli et al. | 706/46 |
| 2010/0057399 A1 * | 3/2010 | Castelli et al. | 702/179 |

OTHER PUBLICATIONS

Palma et al; Efficient estimation of Seasonal Long-Range-Dependent Processes; Nov. 2005; Journal of Time Series Analysis, v26n6 pp. 863-892; dialog abastract only.*
Ouwehand, Pim; Forecasting with group seasonality; Technische Universiteit Eindhoven; v6801C; 2006, abstract only (2 pages).
Smith et al; Cost estimation predictive modeling; regression versus neural network; Wntr, 1997; Engineering Economist, v42, n2, p. 137(25) (dialog classic copy) (15 pages).
Kifer et al., Detecting Change in Data Streams, Proceedings of the 30th VLDB Conference, Toronto, Canada 2004, pp. 180-191.
Shan, Jerry Z., U.S. Appl. No. 11/273,696 entitled "Detecting Data Change Based on Adjusted Data Values" filed Nov. 14, 2005 (32 pages).

* cited by examiner

*Primary Examiner*—Thomas Dixon

(57) ABSTRACT

To analyze a time series of data that exhibits seasonal effects, the time series is processed to obtain a representation in the frequency domain. According to the representation, plural cycle lengths are identified as representing different seasonal effects of the data in the time series, where a first of the plural cycle lengths is greater than a second of the plural cycle lengths.

19 Claims, 2 Drawing Sheets

US 7,865,389 B2

ANALYZING TIME SERIES DATA THAT EXHIBITS SEASONAL EFFECTS

BACKGROUND

In performing analysis of various aspects of an enterprise (e.g., a business, an educational organization, or a government agency), data can be received in the form of a time series, which is a collection of data points over time. The time series can then be analyzed to identify performance-related aspects of the enterprise, or to perform forecasting into the future.

In certain environments, time series can exhibit seasonal effects. For example, time series data relating to retail sales can exhibit a year-end holiday shopping effect, which provides an explanation for stronger sales closer to the end of the year than at other time periods of the year. Another example of a seasonal effect is a quarterly seasonal effect that explains why, for example, the last month in a quarter can be stronger than the first two months in terms of sales. Conventionally, reliance has been made on expertise of human experts in identifying seasonal effects. However, reliance on human experts is subject to variations in analyses (due to differences in experiences, biases, and training of human experts), and thus may not produce reliable results.

BRIEF DESCRIPTION OF THE DRAWINGS

Some embodiments of the invention are described with respect to the following figures.

DETAILED DESCRIPTION

Figure 3:
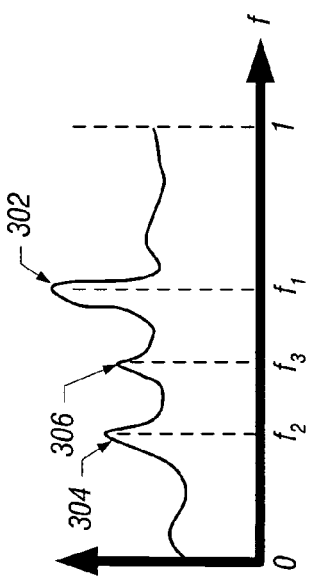
FIG. 3 is a graph of an example spectral density generated in the process according to an embodiment.

In general, according to some embodiments, a time series of data is analyzed to identify one or more cycle lengths corresponding to one or more respective seasonal (or seasonality) effects that may be present in the time series of data. A time series of data refers to a collection of data values over a sequence of successive time points. The time series data can be data representing various one or more aspects (e.g., profitability, cost structure, growth, efficiency, etc.) of an enterprise, such as a business, an educational organization, or a government agency. The time series data can represent, for example, sales data, profit data, revenue data, cost data, data relating to enrollment of students, data associated with operations of a government agency, and so forth.

A seasonal effect, also referred to as a cyclic effect, refers to a time-dependent pattern in the data of the time series, where the pattern tends to repeat every season (or cycle) of a certain length (referred to as the "cycle length"). The seasonal effect is associated with an enterprise, with the type of seasonal effect depending on the type of enterprise. For example, retail outlets can have year-end holiday season seasonal effects, universities can exhibit student enrollment fluctuations during admissions season and graduation season, and so forth. Note that the pattern does not have to be periodic, and in fact may occur at different time intervals in different cycles. One example seasonal effect is the year-end holiday seasonal effect, where strong sales tend to occur near the end of the year. Another example seasonal effect is a quarterly seasonal effect that accounts for variations in the three months of a quarter of a year. The cycle length corresponding to end-of-year seasonal effect is one year (or 12 months). Cycle lengths for other example seasonal effects can be in terms of seconds, minutes, hours, days, weeks, quarters, and so forth.

An analysis technique according to some embodiments allows for the one or more cycle lengths corresponding to one or more seasonal effects in the time series of data to be automatically determined, such as by using software executed in a computer. By automating the determination of cycle lengths for different seasonal effects, reliance is not made on manual analysis of time series data to identify the seasonal effects. Once seasonal effects are identified, the seasonal effects can be modeled and used for various purposes, such as for analysis of existing time series data, or for forecasting into the future.

In general, to enable the identification of a cycle length corresponding to a seasonal effect in a time series of data, a spectral analysis in the frequency domain can be performed on the time series to estimate a spectral density (or spectrum) of the time series. In another embodiment, instead of producing a spectral density of the time series in the frequency domain, another representation can be derived to enable the identification of cycle lengths for seasonal effects.

The spectral density of a time series can be a power spectral density that describes how the time series is distributed with frequency. In some embodiments, the spectral density of a time series is defined by a Fourier transformation of an autocorrelation function of the time series. The spectral density has a unique one-to-one functional mapping with the autocorrelation function, and the spectral density quantifies how much the values of a time series are distributed at different frequencies.

A sample autocorrelation function can be derived using historical data that has been collected over time. Once a sample autocorrelation function is estimated, the spectral density can be derived. In one implementation, a periodogram is used for estimating the spectral density, with the periodogram being defined as the Fourier transformation of the sample autocorrelation function derived from historical data. A periodogram can be regarded basically as the sample version of the spectrum of the time series, except for a difference in the multiplying constant.

Although a periodogram has been described as being one technique for estimating the spectral density, it is noted that other techniques for estimating the spectral density can be used.

Once the spectral density of the time series has been estimated, the analysis technique can analyze the spectral density to identify one or more peaks in the spectral density. A "peak" refers to a value in the spectral density that is relatively higher than some other values in a neighborhood in the spectral density. A "peak" does not necessarily refer to the highest value of the spectral density. In fact, the spectral density can be associated with several peaks of different values.

According to a peak identified in the spectral density, a cycle length corresponding to a seasonal effect can be determined. In fact, if the time series includes multiple seasonal effects, multiple corresponding cycle lengths can be determined from respective peaks in the spectral density, where at least one of the cycle lengths is longer than another of the cycle lengths. The cycle lengths can include a "most significant" cycle length, which is the cycle length associated with the seasonal effect having the largest cycle. The time series can also be associated with the next most significant cycle length, which corresponds to a seasonal effect having a smaller cycle than the cycle having the most significant cycle length. In one example, a time series of data can have both an annual seasonal effect and a quarterly seasonal effect. In this example, the most significant cycle length is 12 months, while the next most significant cycle length is three months. There can be further seasonal effects having smaller cycle lengths, such as monthly cycle lengths, weekly cycle lengths, and so forth.

In accordance with some embodiments, for improved reliability and accuracy of the analysis, outlier detection can be performed on the time series data to remove outlier data, and normalization can be applied on the estimated spectral density. Outlier detection and normalization are described further below.

Figure 1:
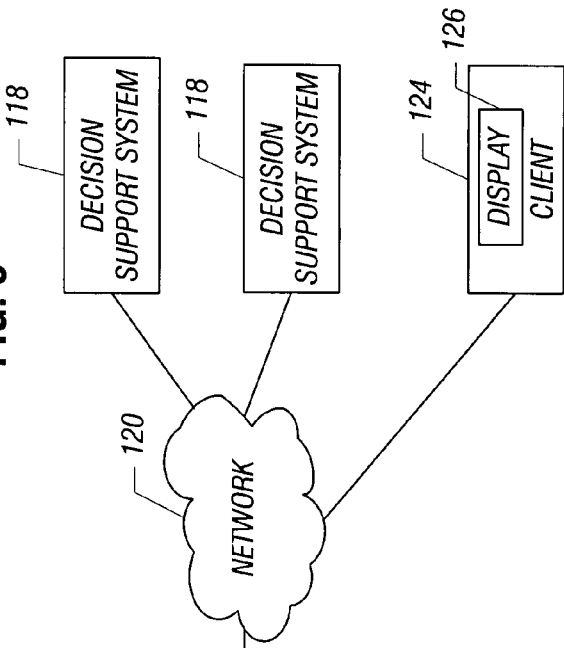
FIG. 1 is a block diagram of an example arrangement that includes a computer that incorporates software executable to perform tasks, according to an embodiment.
Figure 1:
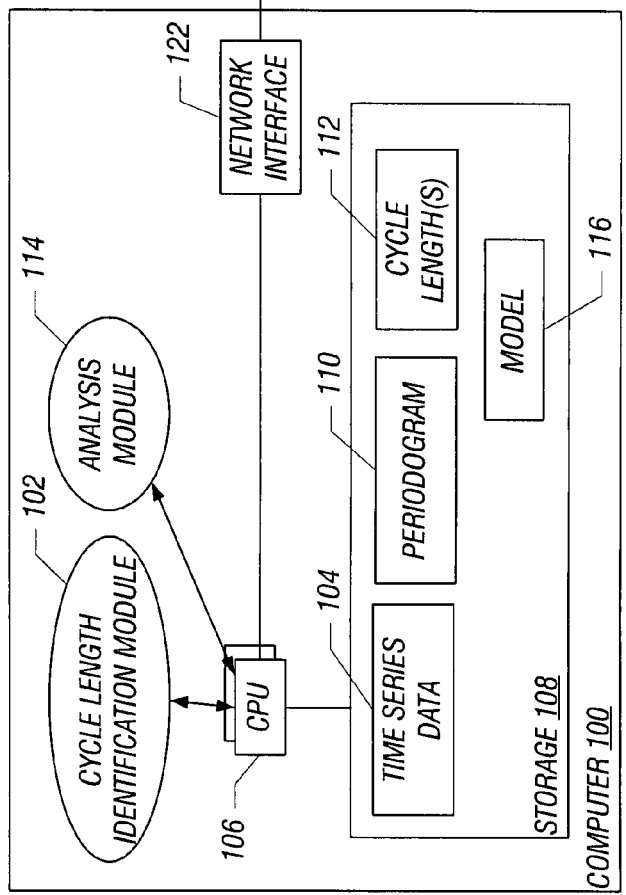

FIG. 1 illustrates an example arrangement that includes a computer 100 in which a cycle length identification module 102 is executable to identify one or more cycle lengths in time series data 104. The cycle length identification module 102 can be a software module executable on one or more central processing units (CPUs) 106. The time series data 104 can be stored in a storage 108 that is connected to the CPU(s) 106.

The storage 108 can be used to store other data structures that are created during execution of the cycle length identification module 102, such as a periodogram 110 that estimates a spectral density of the time series data. An output of the cycle length identification module 102 can be information 112 (e.g., a report, graph, table, etc.) pertaining to one or more cycle lengths corresponding to one or more seasonal effects of the time series data 104.

Another software module that can be executable in the computer 100 is an analysis module 114. In one example, the analysis module 114 can be used to create a model 116, which can be used to represent the time series data 104 and can be used to perform forecasting into a future time window or other analysis. The model 116 can be updated by the analysis module 114 to take into account the information 112 relating to one or more cycle lengths associated with the time series data 104. Examples of the model 116 include a Holt-Winters model, a seasonal autoregressive integrated moving average (ARIMA) model, and so forth. The model 116 and/or information 112 relating to cycle length(s) can be fed to one or more decision support systems 118, which can be remote from the computer 100 and coupled over a data network 120. A decision support system 118 can use the model 116 and/or cycle length(s) to perform various tasks, such as making decisions associated with operations of an enterprise.

The computer 100 includes a network interface 122 to allow communication of data between the computer 100 and the decision support systems 118. A client computer 124 can also be connected over the network 120 to communicate with the computer 100 and/or the decision support systems 118. The client computer 124 has a display 126 to allow the display of various reports or other information associated with analysis performed by the computer 100 or by the decision support systems 118.

Figure 2:
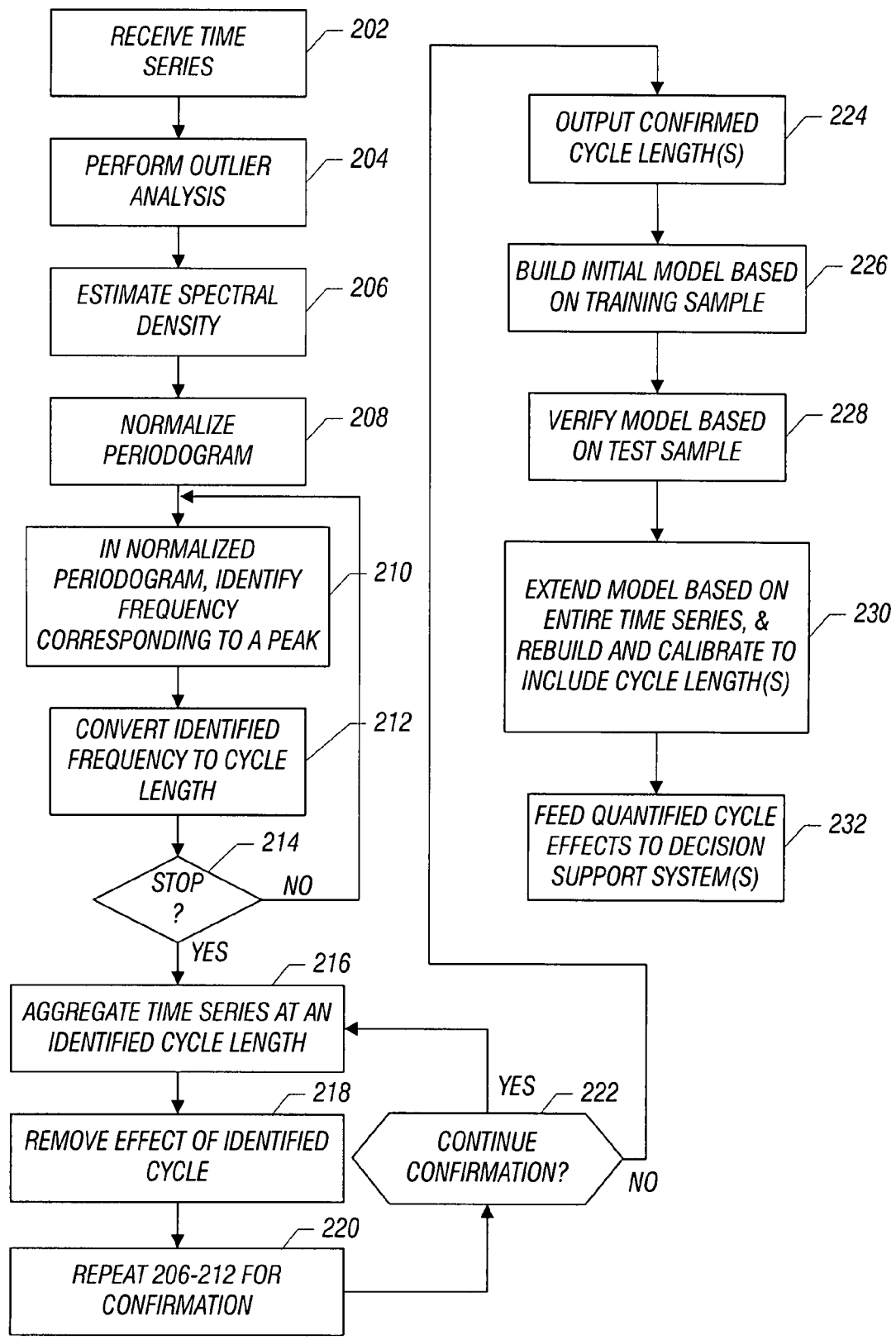
FIG. 2 is a flow diagram of a process that includes identifying cycle lengths corresponding to seasonal effects that may be present in time series data, according to an embodiment.

FIG. 2 is a flow diagram of an analysis technique according to an embodiment. The process of FIG. 2 can be performed by the cycle length identification module 102 and/or analysis module 114 depicted in FIG. 1. Initially, a time series is received (at 202), where the time series received can be from the storage 108 of the computer 100 or from a remote location (e.g., over the network 120). Next, outlier analysis can be performed (at 204) on the time series. Since the time series data exhibits seasonal fluctuations and trend effects, the outlier analysis should avoid removing data values associated with such seasonal fluctuations and trend effects, which constitute valid effects that are to be taken into account when performing analysis of the time series. A trend can be an increasing trend (e.g., sales increasing), a decreasing trend, or some other type of trend. In performing the outlier analysis, one approach is to identify data points that are very deviated from the bulk of data, where the "bulk" refers to the vast majority of the data points of the time series.

In one example, the data points that are "very deviated" include data points having values greater than an upper quantile or less than a lower quantile. The upper and lower quantiles can be based on predefined percentages, such as 1%. Thus, for example, a 1% value can be used as the quantile level specification, which means that the upper quantile is set at 99% and the lower quantile is set at 1%. Thus, data values that are greater than the 99% upper quantile level and data values that are less than the 1% lower quantile value can be identified as outliers and can be replaced. The quantile level specification can be based on historical data. Thus, if the historical data indicates that 1% of all data in the historical data are deemed outliers, then this 1% can be used as the quantile level specification. If there is no prior knowledge regarding the appropriate quantile level specification, the outlier analysis can begin with a lower percentage, such as 0.1%, as the quantile level specification. Also, as part of the outlier analysis, the procedure can check with data sources (the sources that provided the time series data) to confirm that the identified outliers are indeed outliers. The checking can be performed by the computer 100 with data source systems (not shown) over the data network 120, for example.

As part of the outlier analysis, instead of discarding data values that are outside the upper and lower quantiles, such data values are replaced with data values that are within the upper and lower quantiles. For example, the outlier data values can be replaced with the boundary values corresponding to the upper and lower quantiles. The time series generated as part of the outlier analysis is referred to as a cleansed time series, where the cleansed time series is used in the subsequent tasks discussed below.

Next, the analysis technique estimates (at 206) the spectral density of the cleansed time series. In one embodiment, the spectral density is estimated using a periodogram estimation procedure. In one example, a periodogram, represented as $P_{PER}(f)$, can be expressed as follows:

$$P_{PER}(f) = \frac{1}{N}\left|\sum_{n=1}^{N} x[n]e^{-i2\pi fn}\right|^2, 0 \le f \le 1, \quad \text{(Eq. 1)}$$

where N is the number of samples in the time series, x[n] represents the time series data, and f represents frequency. In other implementations, other techniques of estimating the spectral density can be employed. An example spectral density is depicted in FIG. 3, where the horizontal axis represents frequency (f), and the vertical axis represents a magnitude of the spectral density.

The estimated periodogram can be normalized (at 208) if the spectral density has a value larger than one. It is noted that a spectral density can not have a value that is larger than one, if unified scale interpretation and comparison are to be performed across multiple cycle length identifications with the spectrum density. To perform the normalization, the spectral density values at different frequencies are aggregated (such as summed) to form an aggregate value. Thus, for example, if the periodogram has 12 frequencies (1-12), and 12 different values corresponding to the 12 frequencies, then the 12 values are summed to produce a summed value. Then each individual value in the periodogram is divided by the sum to obtain the normalized value for that individual value. From this, a normalized periodogram (or normalized spectral density) is derived.

From the normalized periodogram, a frequency is identified (at 210) at which the estimated spectrum reaches a peak. Note that there may be multiple peaks (e.g., 302, 304, 306 in FIG. 3) at different frequencies (e.g., $f_1$, $f_2$, $f_3$ in FIG. 3). A frequency can be expressed in terms of units of basic time points (of the time series). For example, if the received time series is expressed with monthly data points, then the basic time point is a month. In other implementations, other basic time units can be used. Thus, assuming the base time unit is one month, a frequency of ⅓ corresponds to a cycle length of three months, for example. A frequency of 1/12 corresponds to a cycle length of 12 months, in another example.

In some cases, the cycle length derived from a frequency at which a spectral density attains a peak can be a real number (rather than an integer). For example, the identified frequency for a peak can have a value of 1/3.4, which translates into a cycle length of a real number at 3.4, which does not provide a clear interpretation of a cycle length in a real world application. The computation of a real number such as 3.4 can be due to the noisy nature of real world data contained in the time series. To account for the possibility of obtaining non-integer values, a range (or set) of frequencies can be defined, with computed frequencies having real numbers rounded up or down to frequencies in the set of frequencies. For example, the set of frequencies can have the following values: [1, ⅓, ⅙, 1/12], where the frequency value "1" refers to a one-month cycle length, the frequency value "⅓" refers to a three-month cycle length, the frequency value "⅙" refers to a six-month cycle length, and the frequency value "1/12" refers to a 12-month cycle length. A value of 1/3.4 can be rounded up to ⅓, for example. In another example, a value of 1/4.4 can be rounded to either ⅙ or to ⅓.

The first peak that is identified at 210 is the maximum peak value (among all the peak values in the normalized periodogram). In the example of FIG. 3, the maximum peak value is indicated as 302, and occurs at frequency $f_1$. The frequency for the maximum peak is converted (at 212) into a cycle length and expressed in terms of basic time units. The cycle length in basic time units is computed by taking the reciprocal of the frequency that is identified at 210, assuming that the basic time unit is one (e.g., one month). However, if the basic time unit is at a different level, for example 12, then the cycle length is computed by 12 divided by the identified frequency. The cycle length corresponding to the maximum peak value in the normalized periodogram is referred to as the most significant cycle length.

Next, it is determined (at 214) whether the next cycle length is to be identified or whether the process is to be stopped. The process is stopped if the last cycle length is no longer deemed to be relevant or the last cycle length reaches a user-prescribed level. If the stopping criterion is not met, then the tasks of 210 and 212 are repeated to identify the next most significant cycle length. Thus, in this next iteration of task 210, the frequency corresponding to the next peak value in the normalized periodogram is identified, and the cycle length corresponding to this next identified frequency is determined at 212. This cycle length is the next most significant cycle length. Additional iterations of 210 and 212 are performed to find further less significant cycle lengths until a stopping criterion is met.

The output of the loop of 210, 212, and 214 includes one or more cycle lengths, including a most significant cycle length, the next most significant cycle length, and so forth.

Once the one or more cycle lengths corresponding to respective one or more seasonal effects of the time series are identified, such identified cycle lengths are subject to confirmation, as performed at 216, 218, 220, and 222 in FIG. 2. Confirmation is performed by beginning at the most significant cycle length, and then proceeding to subsequently less significant cycle lengths. Thus, the cleansed time series is aggregated (at 216) at an identified cycle length (which is the most significant cycle length to begin with). Thus, for example, if the most significant cycle length is 12 months, then the aggregation is performed for every 12 months (1 year). If the cleansed time series (containing monthly data points) extends over five years, then aggregation is performed within each year. Aggregation of data values in year 1 is performed, aggregation of data values in year 2 is performed, aggregation of data values in year 3 is performed, and so forth. The aggregation can be either the mean or median (or some other aggregation) within each year. The result of the aggregation at 216 is an aggregated value for each identified cycle (having the identified cycle length). In the above example, the identified cycle would be a yearly cycle having a cycle length of 12 months.

Next, the effect of the identified cycle is removed (at 218) from the time series by subtracting or dividing the aggregated cycle data (e.g., yearly mean or median) from the cleansed time series. Subtraction is performed if the effect is deemed additive, and division is performed if the effect is deemed multiplicative. In one example, if the effect is deemed to be additive, then for each monthly data value in a particular year, the aggregated annual mean or median data value is subtracted from each monthly data value in year 1, the aggregated annual data value is subtracted from each monthly data value in year 2, and so forth, for each of the five years in the above example. In other words, within each cycle having the identified cycle length (e.g., 12 months), the aggregated cycle data value is subtracted from each data value corresponding to a basic time unit (e.g., month in the above example).

Once the effect of the identified cycle is removed from the time series to produce a modified time series, tasks 206-212 are repeated (at 220) for the purpose of confirmation. The repetition of tasks 206-212 for confirmation is referred to as a "confirmation repetition." The confirmation repetition of tasks 206-212 using the modified time series would cause the most significant length identified at tasks 210 and 212 to actually be the second most significant cycle length in the original cleansed time series data, since the effect of the most significant cycle length has been removed at 216 and 218. If the most significant cycle length identified using the modified time series matches the second most significant cycle length based on tasks 206-212 performed on the original cleansed time series, then the second most significant cycle length has been confirmed. If the most significant cycle length identified using the modified time series does not match the second most significant cycle length (to within some predefined threshold) based on tasks 206-212 performed on the original cleansed time series, then the second most significant cycle length is deemed to be not valid.

To confirm the third most significant cycle length (if any), the analysis technique determines at 222 that confirmation is to be continued. To perform confirmation of the third most significant cycle length, the effect of the second most significant cycle length is removed by repeating 216 and 218. Then, confirmation of the third most significant cycle length is performed at 220.

More generally, each iteration of the confirmation loop (216, 218, 220, 222) performs confirmation of the $i^{th}$ (i>1) most significant cycle length, with each iteration of the confirmation loop 216, 218, 220, 222 causing i to be incremented.

After the appropriate number of confirmation loops have been performed, confirmed cycle lengths are output (224). Note that it may be the case that prior to confirmation, that a first number of cycle lengths were identified. However, confirmation may indicate that one or more of the first number of cycle lengths are not valid cycle lengths. Thus, the cycle lengths that are determined to be not valid are not considered to be confirmed, and thus would not be output at 224.

The confirmed cycle length(s) may be used to build a model, such as a Holt-Winters model or an ARIMA model. To build the model, the cleansed time series is divided into two parts: a training sample part and a test sample part. For example, 90% of the cleansed time series can be used as the training sample part, whereas the remaining 10% of the cleansed time series is used as the test sample part. An initial model is built (at 226) based on the training sample part of the cleansed time series. Then, using this model, predicted data values are forecast into the time window corresponding to the test sample part. The predicted data values generated using the model are compared to the actual observed data values in the test sample part of the historical time series to verify (at 228) whether the initial model built at 226 is an accurate model.

If the initial model is verified to be accurate, then the model can be extended (at 230) based on the entire cleansed time series. In other words, instead of building the model based on just the training sample part, as in 226, the model is built on the entire cleansed time series. Moreover, the model is rebuilt and calibrated to include the confirmed cycle length(s). The calibration may include reselection of the identified cycle lengths. For instance, the training sample may dictate a quarterly cycle as the most significant cycle one but the whole sample may dictate the yearly cycle as the most significant one, as a result of the increased observed data points in the data. With changes like that, the model should be rebuilt to provide better inferences.

The model built at 230 can be used to analyze time series data as well as to perform forecasting into the future. Quantified cycle effects can be fed (at 232) to one or more decision support systems (118 in FIG. 1) to perform various decision support tasks. Quantified cycle effects include cycle lengths and corresponding levels of significance (e.g., most significant cycle length, second most significant cycle length, etc). Examples of decision support tasks performed by decision support systems include change-point detection (to detect systematic changes within an enterprise), predictive detection (to detect for events in a future time period based on predicted data values), and forecasting.

Benefits provided by some embodiments may include one or more of the following. The analysis technique is able to automatically identify the presence of multiple cycles in temporal data. The cycle length for each of the cycles identified can be determined. Aggregation can be performed to enable the removal of the effect of any particular cycle in the temporal data. Also, quantitative support for decision making processes can be provided when cycle effects are present or are suspected to be present in temporal data.

Instructions of software described above (including cycle length identification module 102 and analysis module 114 of FIG. 1) are loaded for execution on a processor (such as one or more CPUs 106 in FIG. 1). The processor includes microprocessors, microcontrollers, processor modules or subsystems (including one or more microprocessors or microcontrollers), or other control or computing devices. A "processor" can refer to a single component or to plural components (whether software or hardware).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method executed by a computer to analyze a time series of data that exhibits seasonal effects associated with an enterprise, comprising:

processing, by the computer, the time series to obtain a representation in a frequency domain;

according to the representation in the frequency domain, identifying, by the computer, plural cycle lengths as representing different seasonal effects of the data in the time series, wherein a first of the plural cycle lengths is greater than a second of the plural cycle lengths; and building, by the computer, a model that is calibrated for the identified plural cycle lengths, wherein building the model comprises:

dividing the time series into a training sample part and a test sample part;

building an initial model based on the training sample part;

verifying the initial model using the test sample part; and in response to successful verification, extending the model to cover the entire time series.

2. The method of claim 1, wherein processing the time series comprises:

estimating a spectral density of the time series in the frequency domain, wherein the representation comprises the spectral density; and identifying plural peaks at plural corresponding frequencies according to the estimated spectral density, wherein the plural cycle lengths are based on the frequencies corresponding to the plural peaks.

3. The method of claim 2, wherein estimating the spectral density of the time series in the frequency domain comprises deriving a periodogram of the time series.

4. The method of claim 2, further comprising normalizing the spectral density of the time series to produce a normalized spectral density, wherein identifying the plural peaks is based on the normalized spectral density.

5. The method of claim 2, further comprising converting the frequencies corresponding to the plural peaks to the plural cycle lengths.

6. The method of claim 1, further comprising:

receiving the time series; and cleansing the time series by performing outlier analysis prior to processing the time series to obtain the representation in the frequency domain.

7. A method executed by a computer to analyze a time series of data that exhibits seasonal effects associated with an enterprise, comprising:

processing, by the computer, the time series to obtain a representation in a frequency domain;

according to the representation in the frequency domain, identifying, by the computer, plural cycle lengths as representing different seasonal effects of the data in the time series, wherein a first of the plural cycle lengths is greater than a second of the plural cycle lengths; and confirming at least one of the plural cycle lengths, wherein confirming the at least one of the plural cycle lengths comprises:

removing an effect of a cycle length more significant than the at least one of the plural cycle lengths from the time series, wherein removing the effect causes production of a modified time series; and processing the modified time series to obtain a second representation in the frequency domain; and according to the second representation, identifying a most significant cycle length to compare to the at least one of the plural cycle lengths for confirming the at least one of the plural cycle lengths.

8. The method of claim 7, further comprising communicating the identified cycle lengths to a decision support system to perform a decision support task.

9. The method of claim 1, wherein processing the time series comprises processing the time series containing one of sales data, profit data, revenue data, cost data, data relating to enrollment of students, and data associated with operations of a government agency.

10. A method executed by a computer to analyze a time series of data that exhibits a seasonal effect associated with an enterprise, comprising:

producing, by the computer, a spectral density of the time series;

normalizing, by the computer, values in the spectral density with respect to an aggregate of the values of the spectral density at corresponding frequencies to produce a normalized spectral density;

determining, by the computer, a cycle length corresponding to the seasonal effect based on identifying a peak in the normalized values of the normalized spectral density; and computing the aggregate of the values of the spectral density by computing a sum of the values of the spectral density, and wherein normalizing the values in the spectral density comprises one of: (1) subtracting the sum from each value of the spectral density; and (2) dividing each value of the spectral density by the sum.

11. A method executed by a computer to analyze a time series of data that exhibits a seasonal effect associated with an enterprise, comprising:

producing, by the computer, a spectral density of the time series;

normalizing, by the computer, values in the spectral density with respect to an aggregate of the values of the spectral density at corresponding frequencies to produce a normalized spectral density;

determining, by the computer, a cycle length corresponding to the seasonal effect based on identifying a peak in the normalized values of the normalized spectral density; and performing outlier analysis of the time series to replace one or more outlier data values in the time series prior to producing the spectral density.

12. The method of claim 11, wherein performing the outlier analysis comprises defining upper and lower quantiles, and identifying data values in the time series outside the quantiles as being outliers.

13. The method of claim 11, wherein replacing the one or more outlier data values comprises replacing the one or more outlier data values with predetermined one or more values.

14. The method of claim 11, wherein producing the spectral density comprises computing a periodogram of the time series.

15. The method of claim 11, further comprising receiving the time series that contains one of sales data, profit data, revenue data, cost data, data relating to enrollment of students, and data associated with operations of a government agency.

16. A computer-readable storage medium storing instructions that when executed cause a computer to:

process a time series to obtain a first representation in a frequency domain;

according to the first representation, identify plural cycle lengths as representing different seasonal effects of data of the time series, wherein the seasonal effects are associated with an enterprise, and wherein a first of the plural cycle lengths is greater than a second of the plural cycle lengths; and confirm a first one of the plural cycle lengths by:

removing an effect of a second one of the plural cycle lengths from the time series, wherein removing the effect causes production of a modified time series;

processing the modified time series to obtain a second representation in the frequency domain; and according to the second representation, identifying a cycle length to compare to the first cycle length for confirming the first cycle length.

17. The computer-readable storage medium of claim 16, wherein processing the time series to obtain the first representation comprises:

estimating a spectral density of the time series in the frequency domain, wherein the first representation includes the spectral density;

identifying plural peaks at plural corresponding frequencies according to the estimated spectral density, wherein identifying the plural cycle lengths is based on the frequencies.

18. The computer-readable storage medium of claim 16, wherein the instructions when executed cause the computer to convert the frequencies to the corresponding cycle lengths.

19. The computer-readable storage medium of claim 16, wherein removing the effect of the second cycle length comprises removing the effect of a cycle length more significant than the first cycle length, and wherein identifying the cycle length according to the second representation comprises identifying a most significant cycle length.

* * * * *